Nov. 12, 1940.  C. E. WIESSNER  2,220,984
SHAFT PACKING
Filed Jan. 25, 1939

INVENTOR.
Christopher E. Wiessner
BY Earl & Chappell
ATTORNEY.

UNITED STATES PATENT OFFICE 2,220,984

SHAFT PACKING

Christopher E. Wiessner, Kalamazoo, Mich., assignor to Durametallic Corporation, Kalamazoo, Mich., a corporation of Michigan Application January 25, 1939, Serial No. 252,788

1 Claim. (Cl. 286—11)

The main objects of this invention are:

First, to provide a packing for rotating shafts which is very simple in its parts and at the same time highly effective.

Second, to provide a packing having these advantages which is very durable and is capable of effective packing under high pressures.

Third, to provide an improved shaft packing which is efficient even though the shaft may be out of alignment.

Fourth, to provide an improved packing which is very readily installed and occupies very little space.

Fifth, to provide an improved shaft packing of the sealing ring type which may be arranged within stuffing boxes now widely used.

Objects relating to details and economies of the invention will appear from the description to follow. The invention is defined in the claims.

A preferred embodiment of the invention is illustrated in the accompanying drawing, in which.

Figure 1:
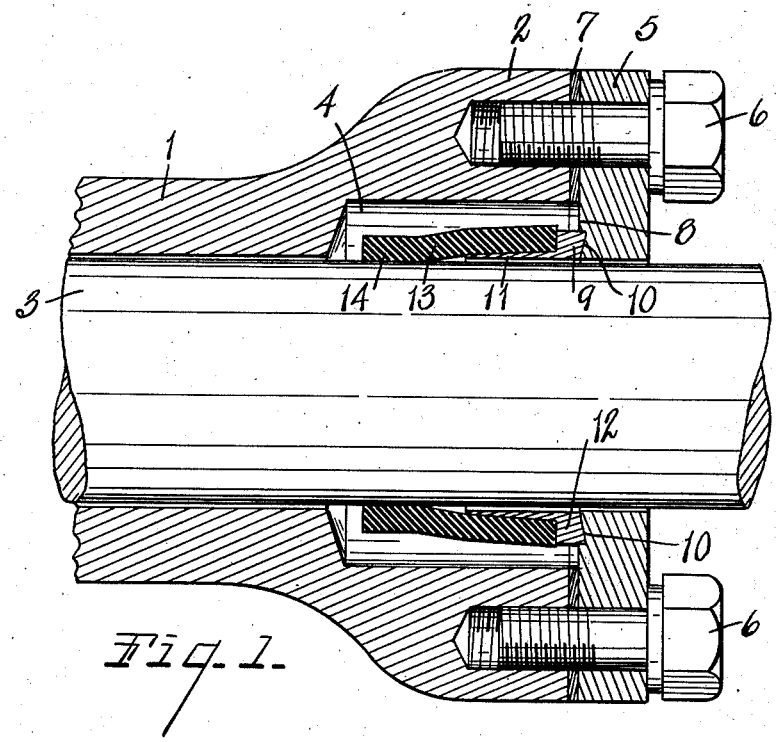
Fig. 1 is a fragmentary view partially in longitudinal section of a structure embodying the features of my invention, only such parts being illustrated as are deemed necessary to illustrate my invention.
Figure 2:
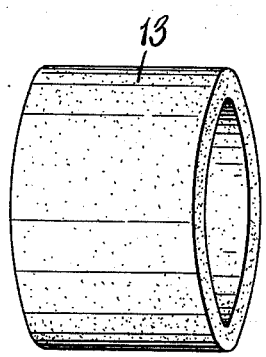
Fig. 2 is a perspective view of the resilient sealing ring supporting element of my invention.

In the accompanying drawing I represents the casing of a pump or other machine which is provided with a stuffing box 2 surrounding the shaft 3. The stuffing box is provided with a packing receiving chamber 4 and with a packing gland 5 secured by means of the bolts 6, a gasket 7 being provided for the packing gland. This packing gland has a sealing ring bearing surface 8 surrounding the shaft.

The sealing ring 9 of suitable metal, preferably hardened to prolong wear, is provided with a concave annular sealing face 10 and with a tapered sleeve-like body portion 11 terminating in the shoulder 12.

The combined supporting and sealing member 13 is a tubular section of elastic resilient material, preferably of rubber. This member 13 is of such internal diameter that when arranged on the shaft 3 it is somewhat expanded and has sealing engagement therewith, and preferably a frictional clamping engagement for a substantial distance at 14 so that the member 13 is retained in its adjusted position on the shaft for rotation therewith and also constitutes a sealing member with the shaft.

The member 13 is also expanded to engage the tapered body portion 11 of the sealing ring and is positioned on the shaft so that it is under axial compression. It acts not only to center the sealing member relative to the shaft, that is, supported in concentric relation to the shaft, but to urge its bearing face against the coacting bearing surface of the stuffing box.

It will be noted that in Fig. 1 this bearing surface 8 of the stuffing box is shown as convexed to conform somewhat to the concaved bearing surface of the sealing ring. It will be understood, however, that in practice it is not necessary to shape the surface 8 to correspond to the face 10 of the bearing member but the sealing member is preferably concaved as illustrated so that when the packing is first installed it presents a relatively restricted edge to the bearing surface of the stuffing box and quickly wears in or seats itself to provide an effective sealing relation between the sealing member and the gland member. In permitting the sealing member to seat itself rather than to provide preformed coacting bearing surfaces any slight irregularities of the bearing surface are either worn away or the sealing ring adjusts itself to them.

Where the packing gland is provided with a sleeve-like portion projecting into the stuffing box, this is preferably machined off to provide a flat disk as illustrated, although of course if there is sufficient room within the stuffing box chamber that need not be done.

One of the advantages of the structure is that misalignment of the shaft does not prevent sealing; also, that pressure within the casing I serves to grip the member 13 more firmly upon the shaft and upon the sealing member and to force the sealing member into sealing engagement with the coacting part.

I have found rubber very satisfactory for the part 13 but it will be understood that synthetic rubber or other resilient material may be employed.

The packing is very compact and easily installed, the sleeve 13 accommodating itself to a considerable variation in shaft diameters, although it will be understood that the devices are made for shafts of different diameters.

Figures 3, 4:
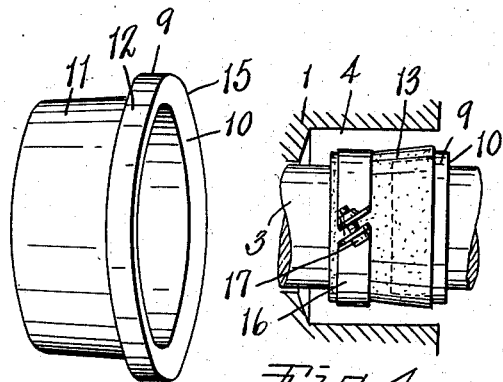
Fig. 3 is a perspective view of the sealing ring of my invention.
Fig. 4 is a fragmentary view of a slightly modified form or embodiment of my invention, the packing gland being omitted.

In the embodiment shown in Fig. 4 the member 13 is provided with a clamp 16 which has an adjusting bolt 17 preferably disposed at an angle to enable engagement thereof from without the stuffing box. This supplements the gripping action of the member 13 with the shaft and may be desirable where certain materials are handled which might deteriorate the rubber or under very high pressures.

It will be obvious that if desired a cement or adhesive might be applied between the shaft and the member 13 or between the member 13 and the sealing member, although I have not found either the clamp or the adhesive to be necessary.

I have illustrated and described my invention in embodiments which are very practical. I have not attempted to illustrate or describe other embodiments or adaptations as it is believed this disclosure will enable those skilled in the art to embody or adapt my invention as may be desired.

Having thus described my invention, what I claim as new and desire to secure by Letters Patent, is:

A seal for rotatable shafts provided with a stuffing box having an apertured gland with an inwardly facing annular bearing surface surrounding the shaft, an annular sealing member of wear resisting metal embracing the shaft but out of bearing contact therewith and provided with an annular concaved bearing face coacting with said bearing surface of said gland, said sealing member having an inwardly tapered sleeve portion terminating in a shoulder at its outer end, and a rubber supporting sleeve surrounding the shaft in taut frictional engagement therewith and having telescoping engagement with the sleeve of the said sealing member and abutting engagement with the shoulder thereof, said rubber supporting sleeve being placed and maintained in axial compression by said frictional shaft engagement and acting by said compression to urge said sealing member into sealing engagement with said bearing surface of said gland.

CHRISTOPHER E. WIESSNER.